United States Patent
Ben Haddou et al.

(10) Patent No.: US 11,421,658 B2
(45) Date of Patent: Aug. 23, 2022

(54) HANDLING DEVICE FOR A TRANSMISSION

(71) Applicant: ZF Friedrichshafen AG, Friedrichshafen (DE)

(72) Inventors: Adil Ben Haddou, Bochum (DE); Steffen Fischer, Nordkirchen-Suedkirchen (DE); Kristiaan Van Rompaey, Friedrichshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 17/274,194

(22) PCT Filed: Aug. 5, 2019

(86) PCT No.: PCT/EP2019/071041
§ 371 (c)(1),
(2) Date: Mar. 8, 2021

(87) PCT Pub. No.: WO2020/052863
PCT Pub. Date: Mar. 19, 2020

(65) Prior Publication Data
US 2021/0355913 A1 Nov. 18, 2021

(30) Foreign Application Priority Data
Sep. 11, 2018 (DE) .................... 10 2018 215 402.3

(51) Int. Cl.
*F03D 13/10* (2016.01)
*F03D 80/50* (2016.01)
(Continued)

(52) U.S. Cl.
CPC .............. *F03D 13/10* (2016.05); *B23P 6/002* (2013.01); *F03D 13/40* (2016.05); *F03D 15/00* (2016.05);
(Continued)

(58) Field of Classification Search
CPC .......... F03D 13/40; F03D 80/50; F03D 13/10; F05B 2230/604; F05B 2230/61;
(Continued)

(56) References Cited

U.S. PATENT DOCUMENTS

2012/0076630 A1* 3/2012 Tehrani ..................... B66F 3/46
414/783
2012/0228839 A1 9/2012 Boulanger et al.
(Continued)

FOREIGN PATENT DOCUMENTS

DE 102010040654 A1 3/2012
EP 1617075 A1 1/2006

*Primary Examiner* — Matthew P Travers
(74) *Attorney, Agent, or Firm* — Leydig, Voit & Mayer, Ltd.

(57) ABSTRACT

A handling device for a transmission includes a first pillar, a second pillar, a first receptacle for the transmission and a second receptacle for the transmission, and a first rail and a second rail. The first receptacle is fixed in the first pillar so as to be rotatable and translationally displaceable. The second receptacle is fixed in the second pillar so as to be rotatable and translationally displaceable in parallel to the first receptacle. The first pillar is fixed in the first rail so as to be translationally displaceable. The second pillar is translationally displaceable in the second rail in parallel to the first pillar. The axes of rotation of the receptacles are aligned or oriented such that they can be brought into alignment by displacing the first receptacle, the second receptacle, the first pillar and/or the second pillar.

13 Claims, 2 Drawing Sheets

(51) Int. Cl.
*B23P 6/00* (2006.01)
*F03D 13/40* (2016.01)
*F03D 15/00* (2016.01)

(52) U.S. Cl.
CPC .......... *F03D 80/50* (2016.05); *F05B 2230/60* (2013.01); *F05B 2230/604* (2013.01); *F05B 2230/61* (2013.01); *F05B 2230/70* (2013.01); *F05B 2230/80* (2013.01)

(58) Field of Classification Search
CPC .............. F05B 2230/70; F05B 2230/80; F05B 2230/60; B66F 7/26; B64F 5/50; B23P 6/002
See application file for complete search history.

(56) References Cited

U.S. PATENT DOCUMENTS

2013/0178326 A1 7/2013 Franke
2014/0334908 A1 11/2014 Hansen et al.

\* cited by examiner

HANDLING DEVICE FOR A TRANSMISSION

CROSS-REFERENCE TO PRIOR APPLICATIONS

This application is a U.S. National Phase Entry under 35 U.S.C. § 371 of International Application No. PCT/EP2019/071041, filed on Aug. 5, 2019, and claims priority to German Patent Application No. DE 10 2018 215 402.3, filed on Sep. 11, 2018. The International Application was published in German on Mar. 19, 2020 as WO 2020/052863 under PCT Article 21(2), which is hereby incorporated by reference.

FIELD

In an embodiment, the present invention provides a handling device for a transmission.

BACKGROUND

The assembly or disassembly of a transmission of a wind power plant is complex in particular in case of maintenance or repair. Without disassembling the transmission, it must be removed from the tower of the wind power plant. In the case of high and poorly accessible wind power plants, in particular in offshore installations, the repair and maintenance of the transmissions therefore incur high costs.

Handling devices for wind-turbine transmissions, which are used in assembly halls, are known from the prior art. The handling devices serve to fix a transmission for assembly. For inserting the inner parts of the transmission, the transmission housing is clamped into the handling device and brought into a vertical position. A crane is needed by means of which the transmission housing is lifted into the device. Use in the tower of a wind power plant is therefore not possible.

SUMMARY

In an embodiment, a handling device for a transmission includes a first pillar, a second pillar, a first receptacle for the transmission and a second receptacle for the transmission, and a first rail and a second rail. The first receptacle is fixed in the first pillar so as to be rotatable and translationally displaceable. The second receptacle is fixed in the second pillar so as to be rotatable and translationally displaceable in parallel to the first receptacle. The first pillar is fixed in the first rail so as to be translationally displaceable. The second pillar is translationally displaceable in the second rail in parallel to the first pillar. The axes of rotation of the receptacles are aligned or oriented such that they can be brought into alignment by displacing the first receptacle, the second receptacle, the first pillar and/or the second pillar.

BRIEF DESCRIPTION OF THE DRAWINGS

Embodiments of the present invention will be described in even greater detail below based on the exemplary FIGURES. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1A:
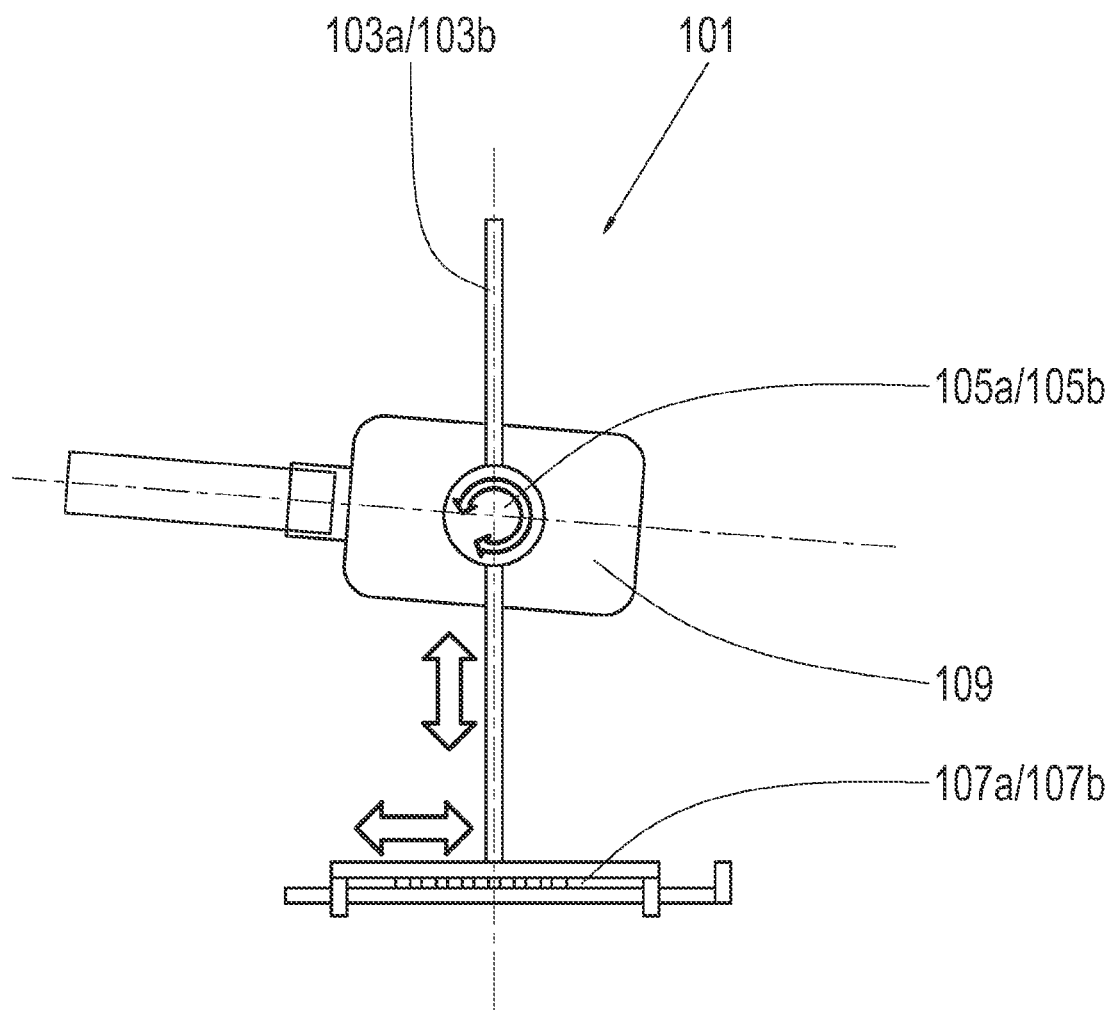
FIG. 1a shows an exemplary handling device in the side view.

In an embodiment, the present invention provides a transmission that does not have the disadvantages inherent in the solutions known from the prior art. In particular, the repair and maintenance of the transmission are to be simplified. In an embodiment, these advantages are achieved by a handling device, a wind power plant having such a device, and associated methods.

In an embodiment, the handling device has a first pillar, a second pillar, a first receptacle for the transmission and a second receptacle for the transmission. The receptacles for the transmission are devices for clamping at least one part of the transmission. The transmission with its housing or one part of its housing is preferably clamped into the receptacles.

The pillars are devices in which the receptacles are fixed so as to be rotatable and translationally displaceable. The first receptacle is thus fixed in the first pillar so as to be rotatable and translationally displaceable. The second receptacle is fixed in the second pillar so as to be rotatable and translationally displaceable. The second pillar can be displaced translationally in parallel to the first pillar; the first pillar can accordingly be displaced translationally in parallel to the second pillar.

According to an embodiment, the handling device has a first rail and a second rail. The rails are devices in which the first pillar and the second pillar are fixed so as to be translationally displaceable. Thus, the first pillar is fixed in the first rail so as to be translationally displaceable, and the second pillar is fixed in the second rail so as to be translationally displaceable. The second pillar can be displaced in parallel to the first pillar; the first pillar can accordingly be displaced in parallel to the second pillar.

So that a transmission that is clamped into the receptacles can be rotated, the axes of rotation of the receptacles must be aligned. The axes of rotation of the first receptacle and of the second receptacle are therefore oriented such that, if the receptacle are not already in a position in which the two axes of rotation are aligned, they can be brought into alignment by displacing the first receptacle, the second receptacle, the first pillar and/or the second pillar.

The handling device according to an embodiment is suitable for use in the tower of a wind power plant. As a result of the displaceability of the pillars, it is possible to remove an installed transmission from its installed position without a crane and to transfer it to a service position. The transmission remains in the tower of the wind power plant.

The first receptacle can preferably be displaced orthogonally to the first rail and thus orthogonally to a direction of displaceability of the first pillar. Correspondingly, the second receptacle can preferably be displaced orthogonally to the second rail and thus orthogonally to a direction of displaceability of the second pillar. Furthermore, the axes of rotation of the receptacles preferably run orthogonally to directions of displaceability of both the receptacles and the pillars.

In a preferred development, the handling device has at least one means for synchronizing the displacing movements of the receptacles and/or the pillars. The means for synchronizing is a means that controls or regulates the speeds of the displacing movements of the receptacles and/or the pillars in mutual dependence. The two receptacles are preferably displaced and rotated at the same speed at all times. Correspondingly, the two pillars are preferably displaced at the same speed at all times.

The handling device is preferably developed as part of a wind power plant. The first rail and the second rail of the handling device are fixed in a machine support of the wind power plant.

The means for synchronizing is preferably developed in such a way that the receptacles are moved at least temporarily in parallel to an axis of rotation of a rotor of the wind power plant or an input shaft of the transmission. Such a movement makes it possible to insert the transmission into corresponding screw connections for assembly or to remove it from the screw connections for disassembly.

A method according to an embodiment serves for assembling a transmission of the wind power plant described above and comprises the following steps:

clamping at least one part of the transmission into the receptacle;
transferring the at least one part of the transmission to the installed position;
fixing the at least one part in the wind power plant.

The at least one part of the transmission is transferred to the installed position by displacing the first pillar in the first rail, the second pillar in the second rail, the first receptacle in the first pillar and/or the second receptacle in the second pillar. The individual movements can be carried out successively or simultaneously.

The installed position is a position of the at least one part of the transmission in the installed state, i.e., in a state in which the transmission is installed in the wind power plant.

The individual method steps are preferably carried out in the following sequence.

In a preferred development, in order to clamp the at least one part of the transmission into the receptacles, the receptacles are positioned beforehand by displacing the first pillar in the first rail, the second pillar in the second rail, the first receptacle in the first pillar and/or the second receptacle in the second pillar such that their axes of rotation are aligned.

In a further preferred development, the at least one part of the transmission is clamped such that it assumes a service position. The service position differs from the installed position. It is an arbitrarily selectable position that serves to simplify or enable assembly work. In particular, the at least one part of the transmission can be oriented vertically in the service position. This means that an axis of the at least one part of the transmission, e.g., an axis of rotation of a component of the transmission or a central or symmetry axis of the at least one part, is oriented horizontally.

In a preferred development, after clamping and, if appropriate, orienting, further parts of the transmission are mounted on or in the at least one part.

In a preferred development, the at least one part of the transmission is subsequently positioned by rotating the receptacles in such a way that the axis of rotation of the rotor and the aforementioned axis of the at least one part run in parallel or are aligned.

In a preferred development, in order to transfer the at least one part of the transmission to the installed position, the receptacles and/or the pillars are moreover displaced translationally. Such a displacing movement preferably takes place in such a way that a movement of the at least one part in parallel to the axis of rotation of the rotor results.

In the installed position, the at least one part of the transmission is lastly fixed in the wind power plant, e.g., in its machine support and/or in a rotor or a main shaft.

In order to transfer the at least one part of the transmission from the installed position to the service position, the method steps described above are preferably carried out in the reverse sequence and in the opposite direction or with the opposite sign of the movements. A corresponding method according to an embodiment comprises the following method steps:

Clamping the at least one part of the transmission into the receptacles;
Releasing the fixing of the at least one part of the transmission; and
Transferring the at least one part of the transmission to the service position.

The at least one part of the transmission is transferred to the service position by displacing the first pillar in the first rail, the second pillar in the second rail, the first receptacle in the first pillar and/or the second receptacle in the second pillar. The individual movements can be carried out successively or simultaneously.

When the at least one part of the transmission is clamped, the transmission is in the installed position. The receptacles are suitably displaced for clamping.

In a preferred development, the removal of the transmission, i.e., its transfer from the installed position to the service position, is carried out by displacing the receptacle or the pillars in such a way that a translational movement of the at least one part of the transmission results, and/or by rotating the receptacles.

Figure 1B:
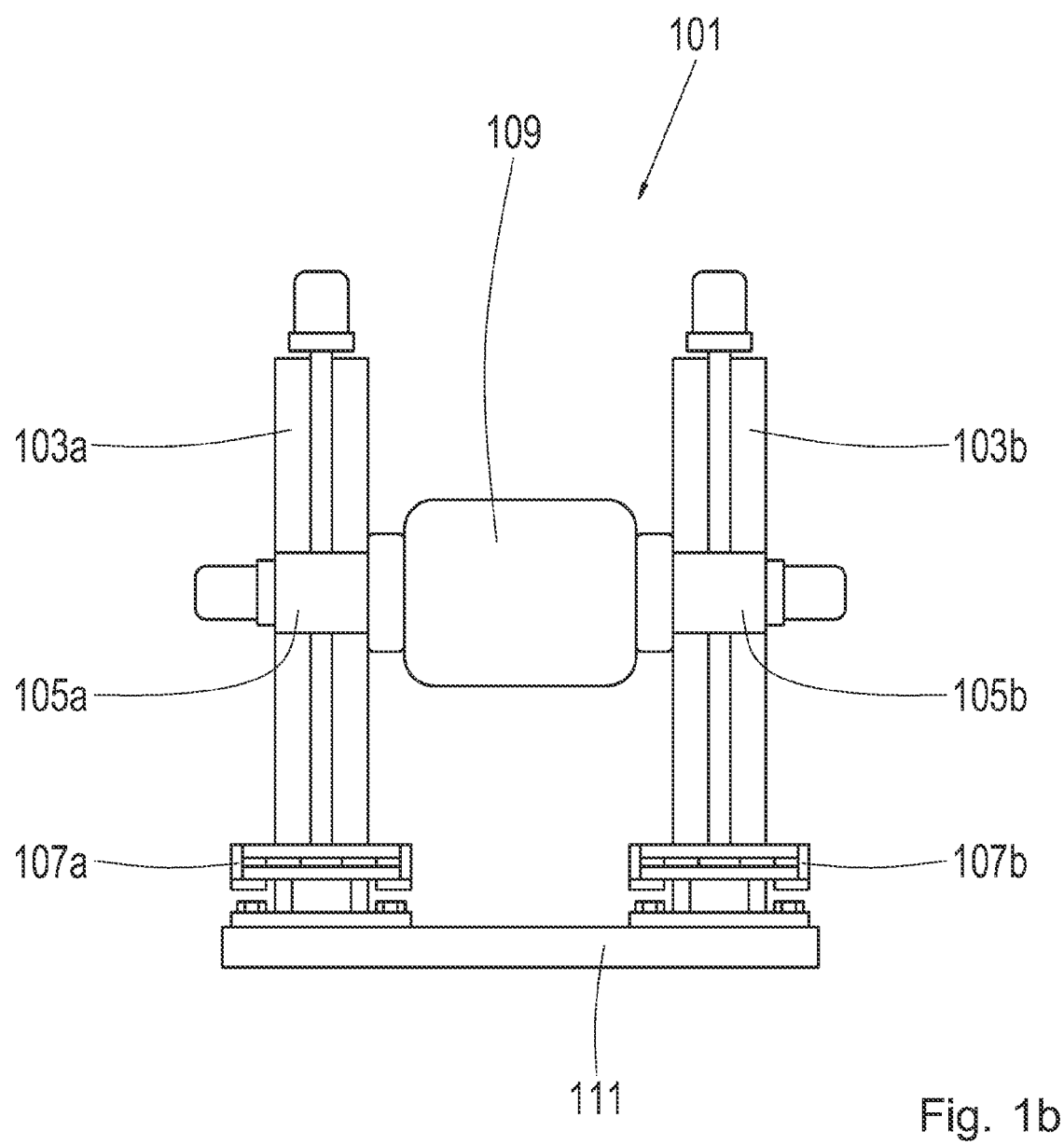
FIG. 1b shows the exemplary handling device in the front or rear view.

The handling device 101 shown in FIGS. 1a and 1b comprises a first pillar 103a, a second pillar 103b, a first receptacle 105a, a second receptacle 105b, a first rail 107a and a second rail 107b. A transmission 109 is clamped into the two receptacles 105a, 105b.

The pillars 103a, 103b are oriented orthogonally to the rails 107a, 107b and are fixed therein so as to be horizontally displaceable. This enables a horizontal displacing movement of the transmission 109.

Furthermore, the receptacles 105a, 105b are fixed in the pillars 103a, 103b so as to be vertically displaceable. This enables a vertical displacing movement of the transmission 109.

In the receptacles 105a, 105b, the transmission 109 can be tilted about a vertical transverse axis, i.e., about a vertical axis that runs orthogonally to a longitudinal axis of the transmission.

The described displacing movements and tilting movements of the pillars 103a, 103b and of the receptacles 105a, 105b can be carried out individually. Some or all movements can also be carried out in an overlapping manner.

The rails 107a, 107b are fixed in a machine support 111 of a wind power plant by screw connections.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE NUMBERS

101 Handling device
103a First pillar
103b Second pillar
105a First receptacle
105b Second receptacle
107a First rail
107b Second rail
109 Transmission
111 Machine support

The invention claimed is:

1. A wind power plant comprising a machine support and a handling device for a transmission, the handling device comprising:
   a first pillar, a second pillar,
   a first receptacle for the transmission and a second receptacle for the transmission,
   a first rail and a second rail arranged in a side-by-side and laterally spaced apart configuration;
   wherein the first receptacle is fixed in the first pillar so as to be rotatable and translationally displaceable;
   wherein the second receptacle is fixed in the second pillar so as to be rotatable and translationally displaceable in parallel to the first receptacle;
   wherein the first pillar is fixed in the first rail so as to be translationally displaceable;
   wherein the second pillar is translationally displaceable in the second rail in parallel to the first pillar;
   wherein axes of rotation of the receptacles are aligned or oriented such that they can be brought into alignment by displacing the first receptacle, the second receptacle, the first pillar and/or the second pillar;
   wherein the first receptacle and the second receptacle are configured such that the transmission is rotatable only by rotation of the first receptacle and the second receptacle; and
   wherein first rail and the second rail of the handling device are fixed in the machine support of the wind power plant.

2. The wind power plant according to claim 1, wherein the displacing movements of the receptacles and/or of the pillars are synchronized.

3. The wind power plant according to claim 1, wherein the displacing movements of the receptacles and of the pillars are synchronized in such a way that a movement of the receptacles at least temporarily in parallel to an axis of rotation of a rotor of the wind power plant or an input shaft of the transmission results.

4. A method for mounting a transmission of a wind power plant according to claim 1, comprising:
   clamping at least one part of the transmission into the receptacles;
   transferring the at least one part of the transmission to an installed position; and
   fixing the at least one part of the transmission in the wind power plant.

5. The method according to claim 4, wherein the receptacles for clamping the at least one part of the transmission are positioned such that their axis of rotation are aligned.

6. The method according to claim 4, wherein the at least one part of the transmission is clamped such that it assumes a service position.

7. The method according to claim 4, wherein after clamping, further parts of the transmission are mounted on or in the at least one part.

8. The method according to claim 4, wherein the at least one part of the transmission is positioned by rotating the receptacles in such a way that an axis of rotation of the rotor and an axis of rotation and/or central axis of the at least one part of the transmission run in parallel and/or are aligned.

9. The method according to claim 8, wherein the receptacles and/or the pillars are displaced in such a way that a translational movement of the at least one part of the transmission to an installed position results.

10. A method for disassembling a transmission of a wind power plant according to claim 1, wherein at least one part of the transmission is initially fixed in the wind power plant; the method comprising:
    clamping the at least one part of the transmission into the receptacles;
    releasing the fixing of the at least one part of the transmission; and
    transferring the at least one part of the transmission to a service position.

11. The method according to claim 10, wherein the receptacles and/or the pillars are displaced in such a way that a translational movement of the at least one part of the transmission from the installed position results.

12. The method according to claim 10, wherein the at least one part of the transmission is transferred to a service position by rotating the receptacles.

13. The method according to claim 12, wherein further parts of the transmission are removed from the at least one part in the service position.

* * * * *